D. A. ISOM.
AUTOMOBILE LOCK.
APPLICATION FILED MAR. 8, 1918.
1,288,905. Patented Dec. 24, 1918.
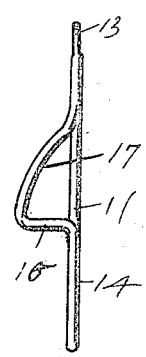
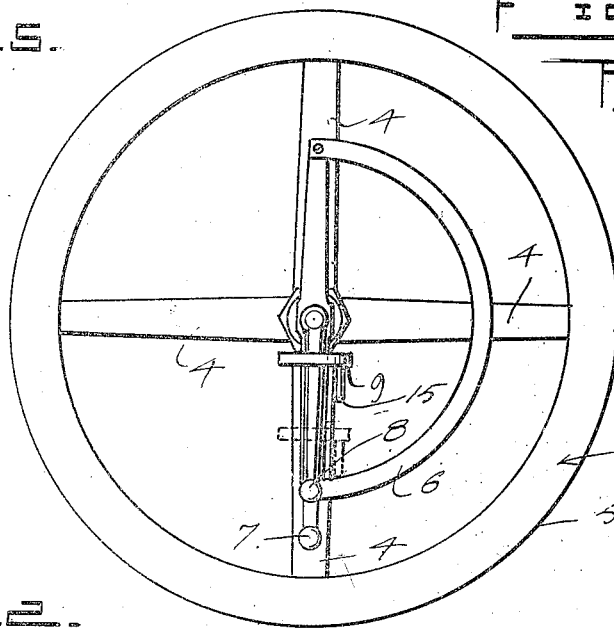
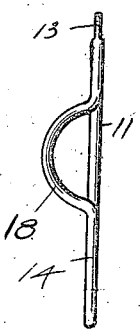
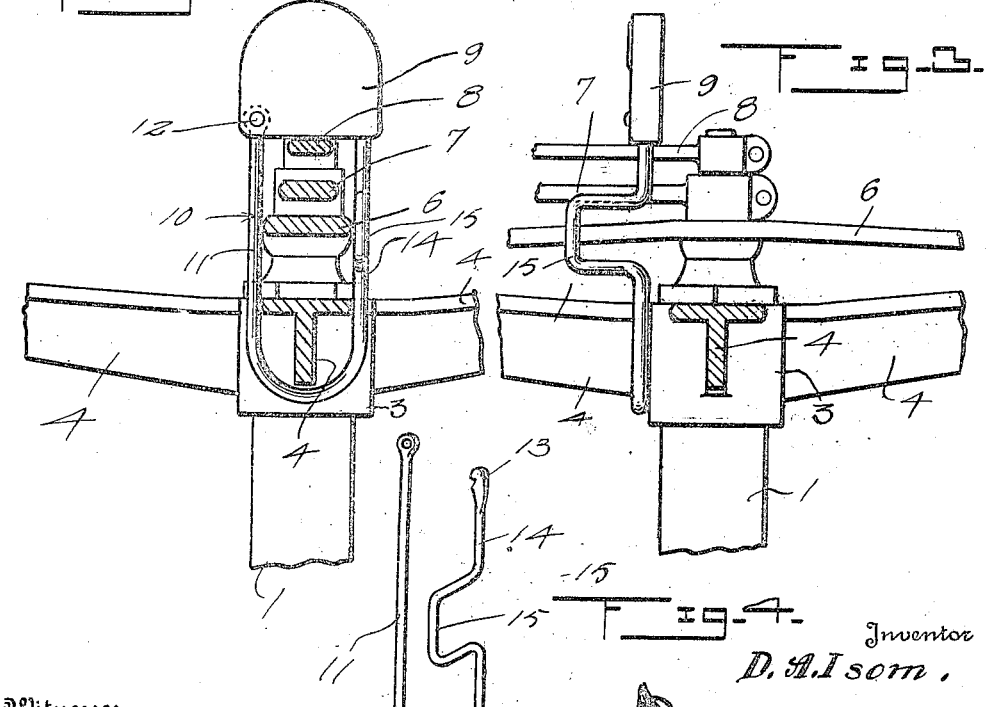
Inventor
D. A. Isom.

UNITED STATES PATENT OFFICE.

DAVID A. ISOM, OF BOISE, IDAHO.

AUTOMOBILE-LOCK.

1,288,905.

Specification of Letters Patent.

Patented Dec. 24, 1918.

Application filed March 8, 1918. Serial No. 221,198.

*To all whom it may concern:*

Be it known that I, DAVID A. ISOM, a citizen of the United States, residing at Boise, in the county of Ada and State of Idaho, have invented certain new and useful Improvements in Automobile-Locks; and I do hereby declare the following to be a full, clear, and exact description of the invention, such as will enable others skilled in the art to which it appertains to make and use the same.

This invention relates to improvements in automobile locks and has for one of its objects the provision of a novel form of shackle adapted to lock the spark and gas levers and spokes of the steering wheel to the usual quadrant, so that the spark and gas levers are held in closed position on the quadrant and also the steering wheel is locked against rotation, thereby locking the automobile against theft.

Another object of this invention is the provision of an offset portion to the shackle which is adapted to engage the quadrant to prevent the shackle from passing around the corner of the quadrant and thereby prevent freeing of the levers and the steering wheel.

A further object of this invention is the provision of an automobile lock of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a plan view of a steering wheel having my invention applied thereto.

Fig. 2 is a fragmentary sectional view of the steering wheel illustrating the novel shackle engaging and surrounding the spark and gas levers and one of the spokes of the steering wheel.

Fig. 3 is a fragmentary sectional view of the steering wheel illustrating the shackle at right angles to that shown in Fig. 2.

Fig. 4 is a perspective view of the shackle.

Fig. 5 is an end elevation of a modified form of shackle.

Fig. 6 is still another modified form of shackle.

Referring in detail to the drawing the numeral 1 indicates the steering post of an automobile on which is secured the steering wheel 2 consisting of the usual hub portion 3 provided with the spokes 4 supporting the hand ring 5. The steering wheel 2 has mounted thereon the usual stationary quadrant 6 on which is adapted to move the gas and spark levers 7 and 8. The foregoing description relates to a well known construction of steering wheel for an automobile and to which my invention is adapted to be applied.

A padlock 9 of any desired construction has connected thereto an elongated shackle 10. The shackle 10 has its arm portion 11 connected to the padlock as illustrated at 12, or in any other desired manner, while its opposite end is provided with the usual notch 13 to engage the locking element of the padlock 9 when inserted therein. The arm portion 14 of the shackle 10 has an offset portion 15 disposed at right angles thereto and is of substantially U-shape. The shackle 10 is applied so that the arm portions 11 and 14 thereof surround the gas and spark levers, quadrant and one spoke of the steering wheel as illustrated in Fig. 2, thus positioning the offset portion 15 so that the same will engage the arcuate shaped portion of the quadrant when the shackle and lock are moved in the direction of the corner of the quadrant, thereby preventing the shackle from being slid about the corner of the quadrant which would free the gas and spark levers as well as the steering wheel.

The offset portion of the shackle may be so bent as to form a straight arm portion 16 and an inclined portion 17 as illustrated in Fig. 5, which portions are adapted to abut the quadrant when the shackle is moved in the direction thereto. The offset portion of the shackle may also be substantially semicircular as illustrated at 18 in Fig. 6.

While I have shown and described the preferred embodiment of my invention, it will be understood that minor changes in construction, combination, and arrangement of parts may be made without departing from the spirit and scope of the invention as claimed.

Having thus described my invention, what I claim is:—

An automobile lock comprising a padlock, a shackle for said padlock adapted to receive one spoke of a steering wheel, one arm portion of a quadrant, and the gas and spark levers, said shackle having one arm portion bent to form an offset portion adapted to abut the arcuate shaped portion of the quadrant to prevent the shackle from being moved about the corner of the quadrant.

In testimony whereof I affix my signature in presence of two witnesses.

DAVID A. ISOM.

Witnesses:
JOHN F. WELLS,
A. F. GRAVES.